2 Sheets. Sheet 1.

L. B. Pitcher,

Mortar Mixer.

No. 107,535.  Patented Sep. 20, 1870.

Witnesses  
Lyman B. Pitcher  Inventor

L. B. Pitcher,

Mortar Mixer.

No. 107,535. Patented Sep. 20, 1870.

WITNESSES

Lyman B. Pitcher INVENTOR

United States Patent Office.

LEMAN B. PITCHER, OF SALINA, NEW YORK.

Letters Patent No. 107,535, dated September 20, 1870.

IMPROVEMENT IN PROCESS AND MACHINERY FOR MAKING MORTAR.

The Schedule referred to in these Letters Patent and making part of the same.

*To all whom it may concern:*

Be it known that I, LEMAN B. PITCHER, of the town of Salina, in the county of Onondaga and State of New York, have invented a new and improved Process for preparing lime-paste, and commingling it, when required, with sand into Mortar, and new and improved Machinery by which said process is made useful; and I do hereby declare that the following is a full, clear, and exact description of the same, reference being had to the annexed drawing making a part of this specification.

The letters used represent corresponding parts wherever they occur.

Figure 1:
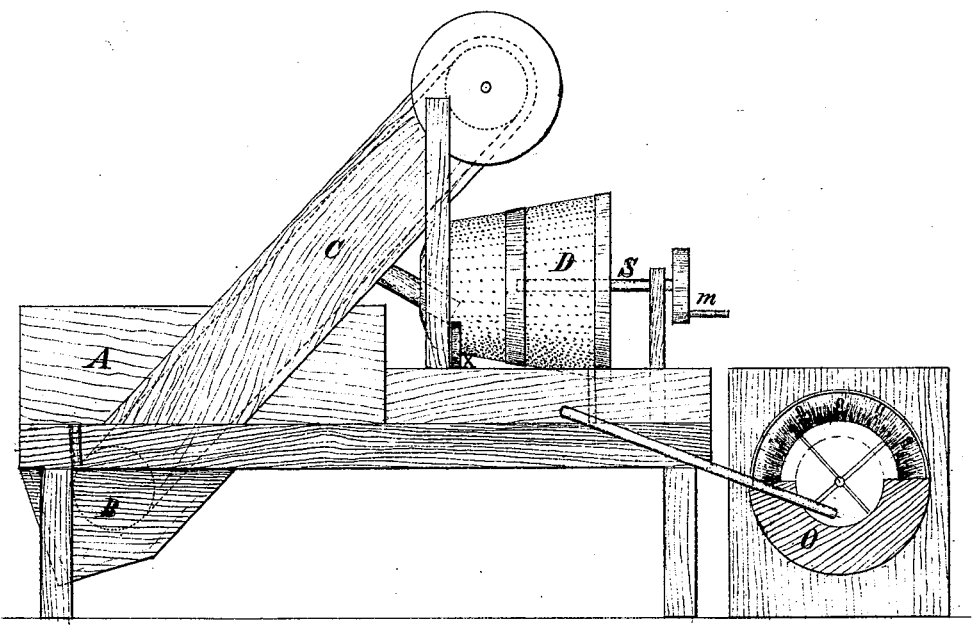
Figure 1 shows a perspective view of the several parts.
Figure 2:
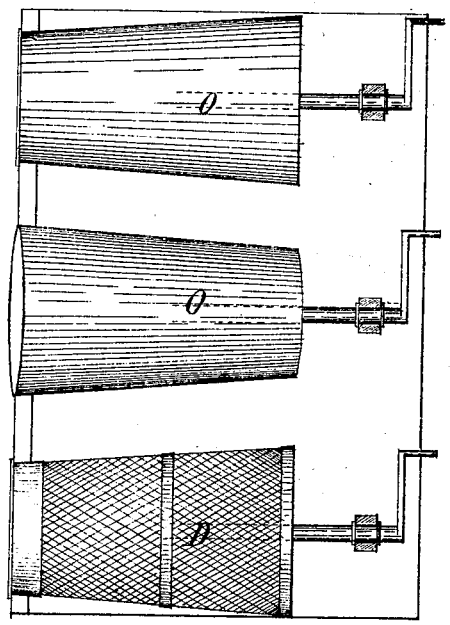
Figure 2 represents, in various forms, the sieve and cylinders.
Figure 2:
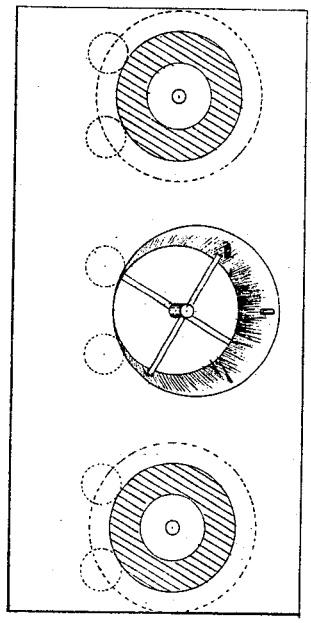
Figure 2:
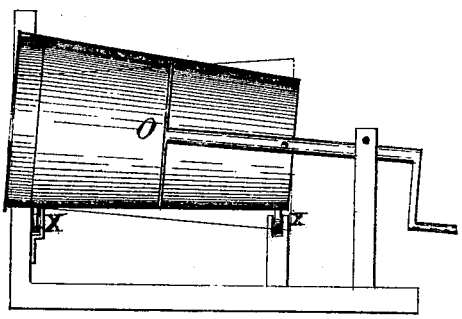

This new and improved mechanical process relates to slaking, handling, liquidizing, and sifting quicklimes from their granulates and dregs, and mixing the fine lime with sand or other materials into mortar compounds, by one continued and quick operation, in which the lime may be prepared and mixed with sand or other materials, and the mortar made ready for use in from one to three hours, at the rate of eight hundred bushels per day.

The mechanical means which I employ are a slaking-vat, a storing and stirring-vat and elevator, a revolving cylindrical sieve, and a mortar-mixing cylinder, or their several equivalents, each made, used, combined, and operated substantially as hereinafter described and shown.

By the means and the process employed a fine liquidized lime-paste is prepared, and made ready for immediate use in mortar compounds, without the usual delay of waiting for limes to slake or cure in pastes or compounds.

The beauty and utility of this invention is that it can take and handle any and all varieties of slaking-limes, mixed or unmixed, in any ordinary condition, and, by slaking or mixing, liquidizing, and sifting, extract and make ready, by one continued and quick operation, all the lime which will readily become fine and fit for use, and cast out or reject the slow-slaking granulates or dregs.

I will now describe the mechanical process and means which I employ in preparing lime and making mortar compounds, for which I ask Letters Patent, as follows:

I slake quicklime with water in larger quantities at a time than is usual, by which more heat is produced, and the lime is slaked quicker, better, and made finer.

Next, I liquidize with water the limes thus made fine, and hold them in a liquid condition, by keeping them well stirred, that they may be readily and rapidly sifted and separated from their lime granulates and dregs, by means of a sieve, with so fine a mesh as to remove all granulates or dregs not fit for immediate use in pastes or mortar compounds.

Lime-pastes with no more water than what they can hold while at rest, and not separate therefrom, are difficult and slow to sift by any known means.

In liquidizing lime no more water need be used than will be required and readily absorbed in mixing it with sand or other materials in mortar compounds.

To liquidize lime-paste, so that it will readily sift, add one gallon, more or less, of water to six of ordinary lime-paste.

Such lime-pastes are, or may be, when required, conveyed, by any usual means, into a hollow revolving mortar-mixing cylinder, where sand or hair, or other materials, are commingled.

Thus, by one continued and operating process, any variety or ordinary quality of slaking-limes may be slaked, handled, liquidized, and sifted from all deleterious granulates or dregs, and made ready to be and worked into mortars ready for use, in from one to three hours.

The mechanical means which I employ to put into operation, carry out and render useful the new and improved process in this specification, are each made, combined, and employed, substantially as follows:

I make a lime-slaking vat, A, with any suitable materials, in any mechanical manner, and of convenient size and form. I would prefer it nearly two feet deep, and to hold and slake at one time a common two-horse wagon load of lime, of seventy bushels or less, with a gate-way leading therefrom, provided with riddling-bars, affixed therein near one and one-half inches apart, more or less, to hold in vat A the larger stones.

Into this vat I put a load, or less, of quicklime at one time, and add, as quick as practicable, all the water which the lime will absorb. The amount which will be required will depend upon the quality of the lime.

I prefer to cover the vat to keep the heat in, and let it rest thirty minutes, more or less.

The amount of water and the time required to slake will vary, according to the variety and condition of the lime, which may be ascertained by trial.

This process creates more heat, and slakes the lime quicker and better, than can be done in smaller quantities in the usual way.

If treated as described, the mass will usually be soft, and, with the additional water to be added to liquidize the fine lime, the whole can be readily stirred up by hand or other power, and the larger stones or dregs raked out with an ordinary hand-rake or otherwise, and the crude lime-paste run off through the riddling-bars described, or otherwise handled or conveyed by any usual means, into sifting-cylinder D, by a regular supply, care being taken to keep the crude paste in vat A well stirred up, so as to prevent it from separating from the water; or, the paste may be run off into vat B, which I prefer to do, where the crude paste can be stirred, handled, and conveyed by elevator C, moved by the power employed to sifting-cylinder D. In the meantime vat A may be slaking another batch.

Vat B may be made of any suitable materials, in any mechanical manner, of capacity to hold the paste flowing from vat A. Its form may be deep and narrow at the bottom, with its sides and ends sloping outwardly and upwardly, or otherwise formed, as desired.

Resting in the bottom of vat B, I place the foot of chain elevator C, while its head or top rises, so as to discharge lime-paste into sifting-cylinder D.

The frame of chain-elevator C may consist of two parallel sides, two feet wide above and six inches wide below (each more or less wide) the top of vat B, made of one and one-half-inch plank, more or less, with length according to circumstances, yet, long enough to reach from the bottom of vat B to a point high enough to discharge into cylindrical sieve D. In the foot of said frame is adjusted, in any mechanical manner, a grooved or other pulley, made of suitable materials, in any usual manner, of twenty, more or less, inches in diameter, to carry the chain to be used.

In the head of said frame another like pulley is adjusted, each pulley to be mounted on suitable shafts and bearings.

Over and around both pulleys an iron or other suitable endless chain, of one-fourth-inch wire link, more or less, is made to run by means of a common driving-pulley, of twenty inches, more or less, in diameter, attached to the outer end of the shaft of the upper grooved pulley, or otherwise made to run by the propelling power in any mechanical manner.

The upper grooved pulley and chain are boxed or inclosed in above the top of the vat B.

I prefer to place the elevator C in position for use at an angle of thirty degrees, more or less. The under and up-going portion of the endless chain should run in an iron, or other enduring trough or narrow place, and should run at the rate of eight hundred feet per minute, more or less, or fast enough to convey the crude lime-paste from the bottom of vat B to sifting-cylinder D in sufficient quantities.

The chain may be provided with buckets, or other means of conveying, but I prefer to use it without any appendages, to the end that, as it moves up the trough, it shall act as a rubber or reducer of the granulates of lime, and assist in reducing them, in combination with the water, to a fluid state.

The chain will rest or move in the trough with the force of its own local weight, and, as a resulting action, will pulverize, more or less, the granulates of lime as the chain moves and carries the lime-paste up and along the trough, but will not so readily crush stones or the remains of stone-coal.

The chain, running in the manner described, is not liable to clog or be stopped.

Another use of this chain-elevator C is that it will, while running, keep the crude lime-paste in vat B stirred up and in motion, by means of the lower grooved pulley and chain, with the result that the paste in vat B shall be conveyed to sifting-cylinder D in nearly a uniform condition. The paste thus conveyed may be discharged from the elevator by an opening and spout, or otherwise, into cylinder D.

I make the revolving cylindrical sieve D in the form of a truncated cone, with a head-piece made of wood, or other suitable materials, with a feeding-in hole in the center of said head-piece of ten inches, more or less, in diameter.

The head-piece is attached to a hoop six inches, more or less, wide, made of iron or other suitable materials, in any common manner, and twenty inches, more or less, in diameter, forming the smaller end of sieve D.

I prefer to use the head-piece, yet it may be dispensed with.

To the hoop described, the cylindrical sieve is attached at the smaller end thereof. The sieve is to be two feet long, more or less.

The larger and discharging end of the sieve D is to be attached to a hoop of suitable strength and materials, two feet in diameter, more or less, made with or attached to spider arms, sustaining the hoop, and also the short shaft S, at the center.

Another set of spider arms, with or without rim, may or may not be employed, to help hold shaft S in position, all made of suitable materials.

The sieve is made of brass or other wire-sieving cloth, or with perforated sheet metal, having one hundred holes or meshes, more or less, to the square inch.

A finer sieve may be used, but such will sift slower. I have tried a sieve with sixty-four meshes to the square inch, and found that sometimes particles of lime large enough to be objectionable would pass through.

I keep the sieve extended lengthwise, when required, by means of braces, from the lesser to the larger hoop in the ends of the sieve D.

The sieve D is to be revolved thirty times per minute, more or less, by means of crank M, or by other mechanical means, and the power to be employed.

When mortar is to be made, the prepared fluid-paste is to be conveyed from sieve D, by means of a rotary pump, or other means, into mortar-mixing cylinder O, where sand or other materials are mixed with it into mortar compounds.

The sand or other materials may be fed or moved into said cylinder O by hand, or by any known mechanical contrivance, suitable for moving sand or gravel, moved by any ordinary motive-power.

I make cylinder O with staves of wood and hoops, to hold it together, or with other suitable materials, in any mechanical manner, about twenty inches in diameter and four feet long, (either more or less,) with parallel or diverging sides, with or without a head-piece, with a feeding-in hole ten inches, more or less, in diameter, in the center thereof in one end of the cylinder. The cylinders O or D to be so positioned and revolved on a level or descending line as either of their forms may require, so as to work the materials being wrought from the receiving to the discharging end, sifting, when required, or discharging materials wrought or dregs.

Either or both may be provided with sharp or blunt teeth, or otherwise provided to mix mortar or work lime-paste.

I prefer to mount the receiving end of either on friction-rollers, made of suitable materials, and mounted in any usual manner, and to mount the discharging end of each or either of said cylinders on a short shaft, made fast to the center of spider or cross-arms in said cylinders, and extending out fifteen inches, more or less, and resting or revolving in a suitable box or bearing, the short shaft and bearing to be so adjusted as to prevent either of said cylinders working endwise.

Thus, lime is slaked, liquidized, handled, sifted, and commingled with sand into mortar.

The different machines and fixtures employed in this invention may be combined as described and shown in the drawings, or either any or all of sifting-cylinder D, cylinder O, elevator C, vat B and A, with or without pumps, or other minor parts, may be mounted on wheels, or other means of conveyance, and moved from place to place, to be used or not with a local or stationary slaking-vat, or other parts, as the circumstances of making lime-paste or mortar may require, or they may be combined, as may be convenient under the existing circumstances, provided the process is substantially employed and carried out.

All the parts to be moved or operated may be moved or operated by hand, or other motive-power applied in the usual manner.

I prefer to use the chain-elevator C, or some contrivance of equal value, yet it may be dispensed with, and the lime-paste in vat A or the slaking-vat may be moved directly to sifting-cylinder D by hand or any ordinary means of power.

It is the liquidizing of the limes, made fine by slaking or other means described, which enables me to sift them in a rapid manner through a sieve so fine as to remove all deleterious granulates and dregs.

Before this, lime-pastes have been made and sifted, but not so made, handled, and sifted as to produce the good and rapid results now obtained.

With no more water in lime-paste than what it will sponge up and hold without readily separating therefrom, when left at rest, it cannot be sifted in a quick and profitable manner by any means known to the public, with a sieve so fine or small in mesh, as to take out all lime-granulates and dregs of a size that would be objectionable in good mortars.

On the other hand, liquidized lime-paste, i. e., lime-paste with more water in it than it will hold without separating therefrom, unless kept in motion, and yet not necessarily more than will be required and absorbed in making it into mortar, can be sifted by sieve D.

I prefer revolving flaring sieve D because it readily, rapidly, and uniformly sifts out the liquid paste, and dumps or moves out the dregs. Yet, I do not wish it to be understood as the only sieve which can be employed to sift liquidized lime from granulates. Any flat, half round, or round, shaking, rocking, or revolving, or any other sieve, may be employed, if so worked or operated as to readily dump or convey away the lime dregs, if the lime is properly liquidized.

On the other hand, no sieve fine enough to remove objectionable granulates and dregs can be profitably employed to sift common lime-pastes unless the pastes are forced through by pressure or centrifugal force. Lime in a liquidized condition should be kept in motion until used.

To make a putty or finishing paste, leave the fluid paste at rest, and permit the water to separate, and then draw it away.

To mix liquidized lime with sand, hair, gravel, or stones, into mortar, groats, or concretes, for masons' work, or building blocks or walls, I believe hollow revolving cylinder O to be a very superior machine. Yet, I believe that any machine, which can work, handle, and manipulate sand, hair, gravel, or stones, or either of them, in a semi-fluid condition without crushing them, can be employed to mix fluid paste with them, though not in an equally good manner. Machines to crush granulates are no longer wanted.

I prefer to mount cylinders D and O as described, yet they may be substantially made and mounted as described in Letters Patent of the United States numbered 60,055, 70,742, or 80,212. The process for which I now ask Letters Patent of the United States avoids the disagreable and slow work of sifting dry limes or lime-pastes, or the waiting for lime-paste to cure. There is little strength in lime alone, and none in sands.

With good materials, the best of mortar is made by just filling (and no more) the voids between the grains of sand with fine lime-paste. Liquidized lime-paste, prepared by the process herein described, can be quicker and more thoroughly commingled with sand by means of cylinder O, or some machine with like powers, than was ever done before, and make more and better mortar from the same measure of limed sand, for no limes are wasted in dangerous granulates commingled, and all sands and voids are sure to be wet and filled.

What I claim, and desire to secure by Letters Patent of the United States, is—

1. The mechanical process of preparing quick-lime by slaking, liquidizing, and sifting therefrom granulates and dregs, substantially in the manner and for the purposes as set forth and described.

2. The arrangement of slaking-vat A with conical or flanged sifting-cylinder D, as herein shown.

3. The combination of conical sifting-cylinder D, elevator C, and vat A, constructed and operated in the manner and for the purpose herein described and shown.

4. The combination and arrangement of mixing-cylinder O, vat A, elevator C, and conical sifting-cylinder D, substantially as and for the purpose herein shown and described.

LEMAN B. PITCHER.

Witnesses:
C. W. SMITH,
J. B. SABINE.